(12) United States Patent
Gupta et al.

(10) Patent No.: US 11,200,254 B2
(45) Date of Patent: Dec. 14, 2021

(54) EFFICIENT CONFIGURATION REPLICATION USING A CONFIGURATION CHANGE LOG

(71) Applicant: EMC IP Holding Company LLC, Hopkinton, MA (US)

(72) Inventors: Kaushik Gupta, Singhbhum (IN); Shiv Shankar Kumar, Pune (IN); Jai Prakash Gahlot, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 16/742,227

(22) Filed: Jan. 14, 2020

(65) Prior Publication Data
US 2021/0216568 A1 Jul. 15, 2021

(51) Int. Cl.
*G06F 16/00* (2019.01)
*G06F 16/27* (2019.01)

(52) U.S. Cl.
CPC .................. *G06F 16/27* (2019.01)

(58) Field of Classification Search
CPC ...................................................... G06F 16/27
See application file for complete search history.

(56) References Cited

U.S. PATENT DOCUMENTS

| | | | |
|---|---|---|---|
| 8,898,108 B2* | 11/2014 | Berinde | G06F 11/1461 707/610 |
| 2004/0260718 A1* | 12/2004 | Fedorov | G06F 9/44505 |
| 2020/0257593 A1* | 8/2020 | Zhou | G06F 11/0727 |

* cited by examiner

*Primary Examiner* — Khanh B Pham
(74) *Attorney, Agent, or Firm* — Amin, Turocy & Watson, LLP

(57) ABSTRACT

Efficient configuration replication using a configuration change log is described herein. A method as described herein can include identifying, by a device operatively coupled to a processor, modified configurations from among a group of configurations associated with a first computing cluster; fetching, by the device, the modified configurations from the first computing cluster; and replicating, by the device, the modified configurations from the first computing cluster to a second computing cluster that is distinct from the first computing cluster and omitting replication of one or more unmodified configurations from among the group of configurations associated with the first computing cluster.

20 Claims, 11 Drawing Sheets

500

| Configuration | Last Modified (UTC-05:00) |
|---|---|
| SMB | 2019-10-25 14:12:15 |
| HDFS | 2019-10-25 14:10:07 |
| Anti-malware | 2019-10-25 14:13:08 |
| User settings - *aaaaa* | 2019-10-25 14:11:37 |
| User settings - *aaaab* | 2019-10-25 14:10:58 |

EFFICIENT CONFIGURATION REPLICATION USING A CONFIGURATION CHANGE LOG

TECHNICAL FIELD

The subject application is related to data storage, and more particularly, to techniques for managing data backup and protection in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way.

NAS systems and/or other file storage systems can utilize various techniques to protect data stored on the system. One such technique is replication, in which some or all data stored on the system is replicated (copied) to a secondary location, e.g., according to one or more replication policies. In addition to stored data, configuration information can also be replicated to a secondary location in order to facilitate consistent configurations at the primary and secondary sites. This can, in turn, provide a seamless user experience in the event of a failover to the secondary site.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a configuration tracking component that identifies modified configurations of a group of configurations associated with a first computing cluster of the data storage system, a fetching component that obtains the modified configurations as identified by the configuration tracking component from the first computing cluster, and a replication component that replicates the modified configurations as obtained by the fetching component from the first computing cluster to a second computing cluster of the data storage system that is distinct from the first computing cluster, where the replication component omits replication of one or more unmodified configurations of the group of configurations.

In another aspect, a method is described herein. The method can include identifying, by a device operatively coupled to a processor, modified configurations from among a group of configurations associated with a first computing cluster; fetching, by the device, the modified configurations from the first computing cluster; and replicating, by the device, the modified configurations from the first computing cluster to a second computing cluster that is distinct from the first computing cluster and omitting replication of one or more unmodified configurations from among the group of configurations associated with the first computing cluster.

In an additional aspect, a machine-readable medium including executable instructions is described herein. The instructions, when executed by a processor of a data storage system, can facilitate performance of operations including tracking modified configurations from among a group of configurations associated with a first computing subsystem of the data storage system, acquiring the modified configurations from the first computing subsystem, and replicating the modified configurations from the first computing subsystem to a second computing subsystem that is distinct from the first computing subsystem while omitting replication of one or more unmodified configurations from among the group of configurations.

DESCRIPTION OF DRAWINGS

Various non-limiting embodiments of the subject disclosure are described with reference to the following figures, wherein like reference numerals refer to like parts throughout unless otherwise specified.

FIG. 5 is a diagram depicting an example structure that can be utilized for a configuration change log in accordance with various aspects described herein.

DETAILED DESCRIPTION

Figure 1:
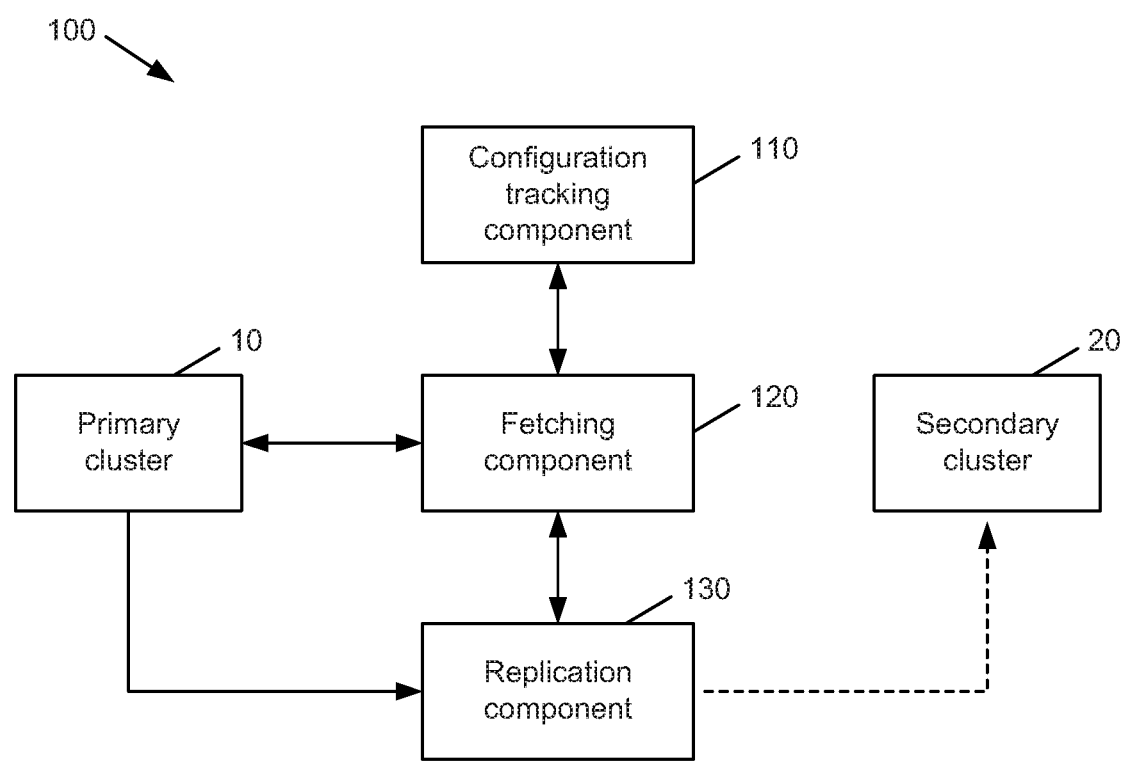
FIG. 1 is a block diagram of a system that facilitates efficient configuration replication using a configuration change log in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In order to enhance the security of stored data, a file storage system can utilize a replication facility for disaster recovery. By way of example, a data storage system can include a primary storage cluster and one or more secondary storage clusters, and recurring replication jobs can be defined via replication policies on the primary cluster to replicate stored data to the secondary cluster(s). The primary and secondary storage clusters are generally associated with different computing sites; however, respective clusters associated with a data storage system could be hosted within a same site, distributed among several sites, and/or configured in any other suitable manner.

In an aspect, a replication policy can accept a storage location, e.g., as defined by a directory path or the like, and replicate the data at that location (e.g., files stored in the specified directories) to a secondary site. Replication policies can be configured and executed on the basis of recovery point objectives (RPOs) associated with different directories in an underlying disaster recovery plan. Replication policies can also use various filters as desirable to replicate specific files, or types of files, under a directory tree.

In another aspect, an RPO for a given directory can define a tolerable time interval between backup or replication operations for data stored in that directory. As such, the RPO for a directory defines a maximum tolerable time period for which data may be lost following a disaster event such as a total site failure. By way of example, an RPO of 24 hours for a given directory indicates that the contents of that directory are to be replicated no less frequently than once every 24 hours.

In order to improve the integrity of data stored on a data storage system and protect said data against site failures and/or other disaster events, a data storage system can utilize multiple distinct computing clusters or sites that are structured such that they provide substantially similar access to the data stored by the system. In an aspect, this common access between sites can be achieved by replicating (e.g., copying) data stored at respective sites of the system to respective other sites, e.g., at regular intervals defined by an RPO, etc., such that the data stored by the system is synchronized among the respective sites. As used herein, the terms "stable state" and/or "steady state" refer to the state in which multiple sites or clusters of a data storage system are fully synchronized.

Additionally, in order to facilitate a seamless experience between different computing sites or clusters associated with a system, configuration data associated with the respective sites can also be replicated in addition to the stored data to ensure that each site or cluster in the system operates similarly. However, replicating configuration data from a source cluster to a target cluster generally requires all of the configuration data to be read from the source cluster and then applied to the target cluster. This can involve a large number of configuration fetch requests, which can be substantially costly in terms of network bandwidth, computing resources, etc. For example, a request can, in turn, result in backend requests that fetch data from all of the computing nodes of the cluster. As a result, it is desirable to implement techniques that reduce the overhead associated with replication of configuration data while still maintaining a common experience between all clusters and associated nodes of the system.

With reference now to the drawings, FIG. 1 illustrates a block diagram of a system 100 that facilitates efficient configuration replication using a configuration change log in accordance with various aspects described herein. As shown by FIG. 1, system 100 includes a configuration tracking component 110 that identifies modified configurations of a group of configurations that are associated with a first computing cluster, here a primary cluster 10, of the data storage system. In an aspect, a computing cluster, such as the primary cluster 10 and/or the secondary cluster 20 further shown in FIG. 1 as described below, can include one or more computing devices, e.g., computing nodes, which can be accessed by one or more system users to access, store, and/or modify data stored at system 100. In some implementations, respective clusters associated with system 100 can be associated with different physical and/or logical computing sites. For example, the primary cluster 10 shown in system 100 can be associated with a primary site while the secondary cluster 20 shown in system 100 can be associated with a different secondary site. Other configurations can also be used.

As further defined herein, a configuration can refer to any suitable information pertaining to the operation of a computing cluster and/or the data storage system as a whole. Examples of configurations that can be tracked by the configuration tracking component 110 can include, but are not limited to, network addresses (e.g., Internet Protocol (IP) addresses) used by various computing nodes in a given cluster, user quotas or access permissions, per-user settings (e.g., home directories, user preference settings, etc.), setup information for one or more protocols utilized by system 100 (e.g., Server Message Block (SMB) protocol settings, Hadoop Distributed File System (HDFS) settings, etc.) and/or information relating to whether particular protocols are enabled or disabled for system 100, antivirus or other anti-malware settings, system audit settings, and/or any other information that relates to the operation of system 100 and/or the clusters 10, 20.

In an aspect, the configuration tracking component 110 can utilize one or more techniques as described herein to maintain a configuration change log for the primary cluster 10, which can be utilized by system 100 as further described below to improve the operation of system 100. By way of further reference, techniques for constructing and maintaining a configuration change log are described in further detail below with respect to FIGS. 2-4, and an example structure that can be utilized for such a log is described in further detail with respect to FIG. 5.

As further shown in FIG. 1, system 100 can also include a fetching component 120 that can obtain information from the primary cluster 10 that relates to the modified configurations associated with the primary cluster 10 as identified by the configuration tracking component 110. Based on these fetched configurations, system 100 as shown in FIG. 1 further includes a replication component 130 that can replicate the modified configurations as obtained by the fetching component 120 from the a first cluster, e.g., the primary cluster 10, to a second, distinct cluster, e.g., the secondary cluster 20 shown in system 100. In an aspect, the replication component 130 can facilitate the replication of modified configurations associated with the primary cluster 10 while omitting replication of one or more unmodified configurations, thereby reducing network bandwidth and/or computing resources (e.g., processor cycles, memory usage, power consumption, etc.) associated with fetching and replicating all configurations regardless of modification. Other advantages and/or improvements to the operation of a computing system as provided by system 100 and/or the other embodiments provided herein can also be realized.

Figure 2:
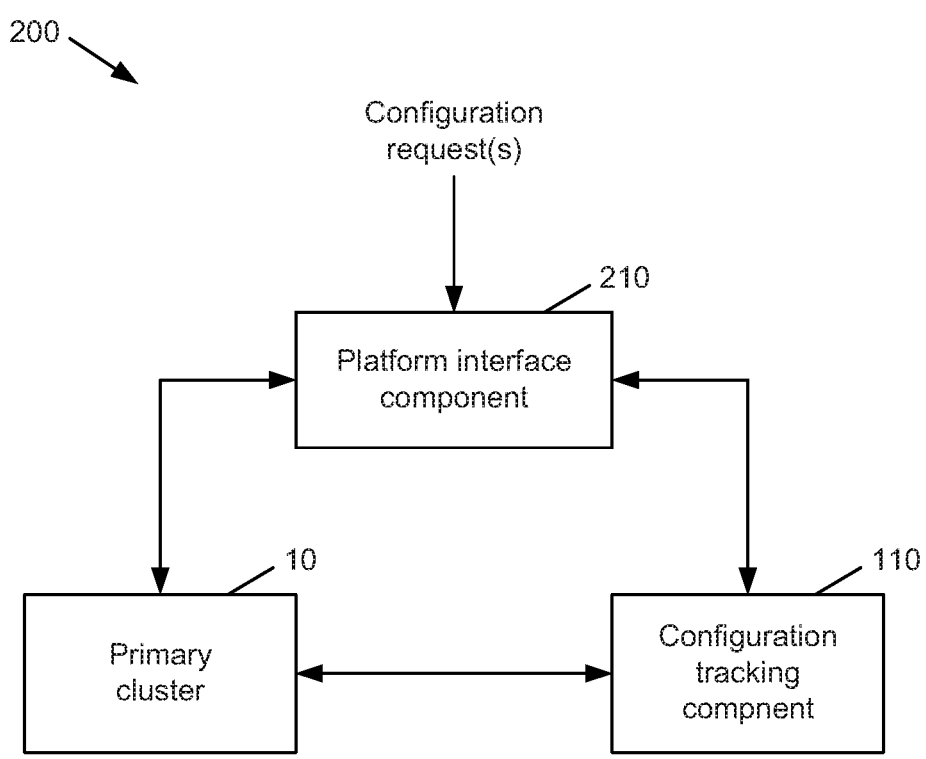
FIG. 2 is a block diagram of a system that facilitates receiving and handling configuration requests in a data storage system in accordance with various aspects described herein.

Turning now to FIG. 2, a block diagram of a system 200 that facilitates receiving and handling configuration requests in a data storage system in accordance with various aspects described herein is illustrated. Repetitive description of like elements employed in other embodiments described herein is omitted for brevity. As shown by FIG. 2, system 200 includes a platform interface component 210 that can receive requests relating to configurations associated with a computing cluster, e.g., a primary cluster 10. In an aspect, the platform interface component 210 can be implemented at least in part via a platform application programming interface (Platform API or PAPI) that handles incoming configuration requests. In an aspect, the PAPI can serve as a configuration gateway for the primary cluster 10 to enable requests pertaining to some or all configurations of the primary cluster 10 to be handled by a single component in a standardized manner.

In an aspect, a configuration request specifying a target configuration associated with the primary cluster 10 can be received by the platform interface component 210. In addition to handling the configuration request, the platform interface component 210 can, either independently or with the aid of the configuration tracking component 110, determine whether the configuration request, once handled, would change the operating state of the primary cluster 10 with respect to one or more configurations (e.g., by changing, deleting, writing, or otherwise modifying any configuration data associated with the primary cluster 10). As further shown by system 300 in FIG. 3, in response to determining that an incoming request would alter an operating state of the primary cluster 10, a logging component 310 associated with the configuration tracking component 110 can record information relating to the request in a configuration change log and/or other data structure. Subsequently, the configuration tracking component 110 can utilize the configuration change log maintained by the logging component 310 to identify changed configurations at the time of replication, as described above with respect to FIG. 1.

Figure 3:
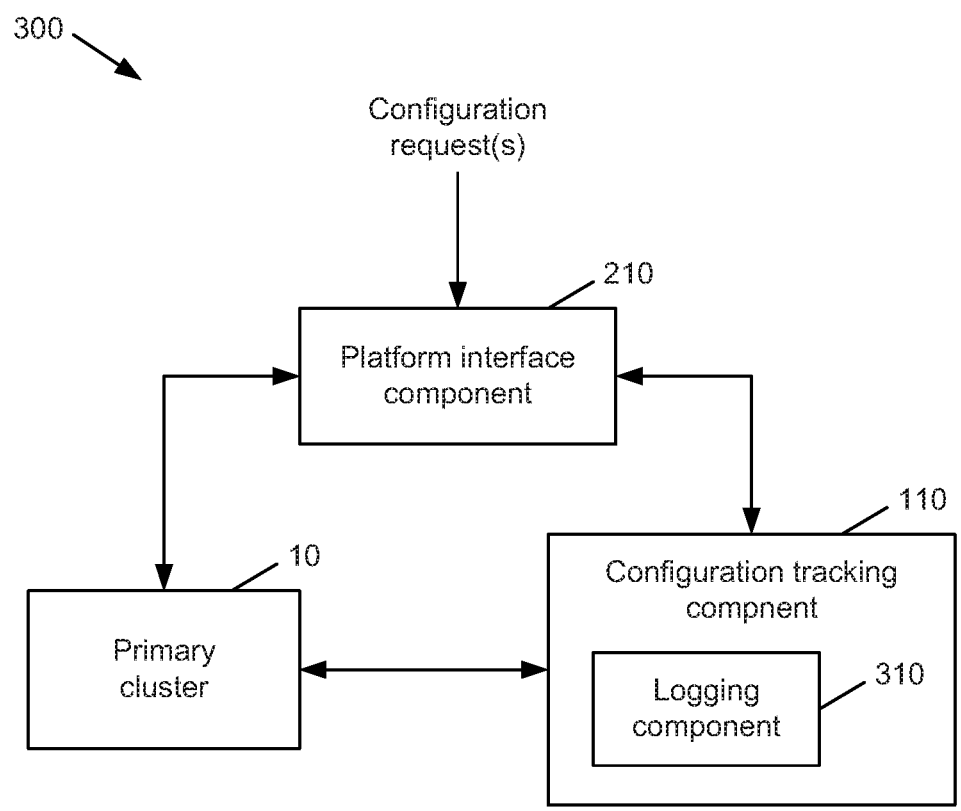
FIG. 3 is a block diagram of a system that facilitates maintaining a configuration change log based on incoming configuration requests in accordance with various aspects described herein.

It should be appreciated that while the logging component 310 is illustrated in FIG. 3 as part of the configuration tracking component 110, the logging component 310 could also or alternatively be implemented as a standalone component, a subcomponent of the platform interface component 210, and/or by any other suitable means.

Figure 4:
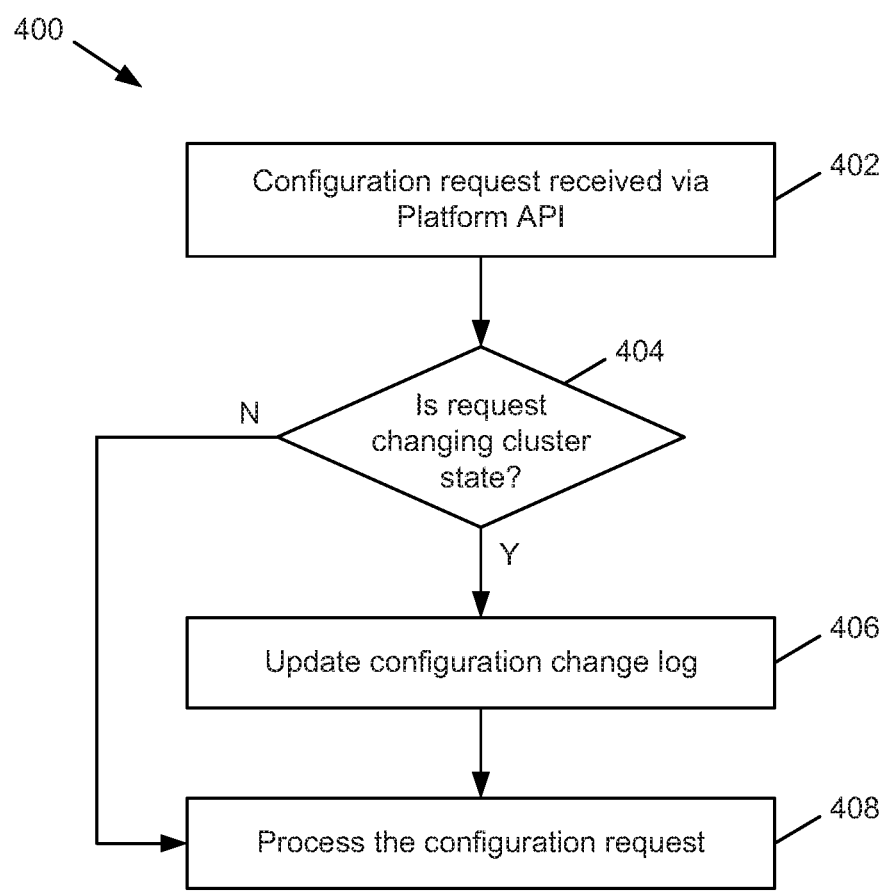
FIG. 4 is a flow diagram of a method for logging and processing configuration requests in accordance with various aspects described herein.

Turning to FIG. 4, a flow diagram of a method 400 that can be utilized by system 300 and/or other appropriate systems and/or system components to maintain a configuration change log is provided. At 402, a configuration request can be received via a Platform API, e.g., as implemented via the platform interface component 210.

At 404, the Platform API, the configuration tracking component 110, and/or other suitable components can determine whether the request alters the state of the primary cluster 10, e.g., by modifying, adding, or removing configuration data associated with the primary cluster 10. If the request is determined at 404 to modify the cluster state, method 400 can proceed to 406, at which a configuration change log can be updated (e.g., by the logging component 310) based on the request.

Following updating the configuration change log at 406, or in response to determining at 404 that the request received at 402 does not alter the cluster state, the configuration request can be processed (e.g., by the platform interface component 210) at 408.

In an aspect, the logging component 310 shown in system 300 can generate a configuration change log in any suitable format, such as a text record, a table, a database, a list or linked list structure, etc. By way of specific, non-limiting example, diagram 500 in FIG. 5 shows a configuration change log structured as a database. The configuration change log shown by FIG. 5 includes respective records, which are depicted in FIG. 5 in a tabular format for purposes of visualization but could take any suitable structure(s). The records shown in diagram 500 can include fields such as an identifier for respective configurations, timestamps indicating times at which the respective configurations have been modified, and/or other suitable fields.

In some implementations, a configuration change log database as shown by diagram 500 can be configured to reflect only changes to respective configurations that have been made since a last completed replication in order to track only the configurations that are to be fetched for the next replication. As such, the logging component 310 and/or other suitable component(s) can clear the configuration change log upon successfully completing a replication.

In the example shown in diagram 500, the configuration change log can contain respective records for various configurations associated with an underlying cluster. Here, records are included for SMB, HDFS, and anti-malware configurations as well as per-user settings for respective users. It should be appreciated, however, that the records shown in diagram 500 are for purposes of illustration and that other configurations could also be included.

In one example, all records can be removed from the configuration change log once they have been successfully replicated. Accordingly, when a configuration is changed, the logging component 310 can record the changed configuration by adding a record to the configuration change log corresponding to the changed configuration in response to determining that no records corresponding to that configuration are present in the log. Alternatively, if a record for the configuration is present, the logging component 310 can update a timestamp associated with the existing record to the time at which the relevant configuration request was received instead of adding an additional record to the log for the same configuration, thereby reducing the overall number of entries included in the log while still maintaining an accurate record of the configurations that have been changed.

In another implementation, the configuration change log can contain one record for each configuration associated with the system, and these records can be set to a default (or empty) timestamp field upon a successful replication. In this implementation, the logging component 310 can update the configuration change log by modifying existing records, e.g., by updating timestamps as described above, rather than adding new records to the log.

Figure 6:
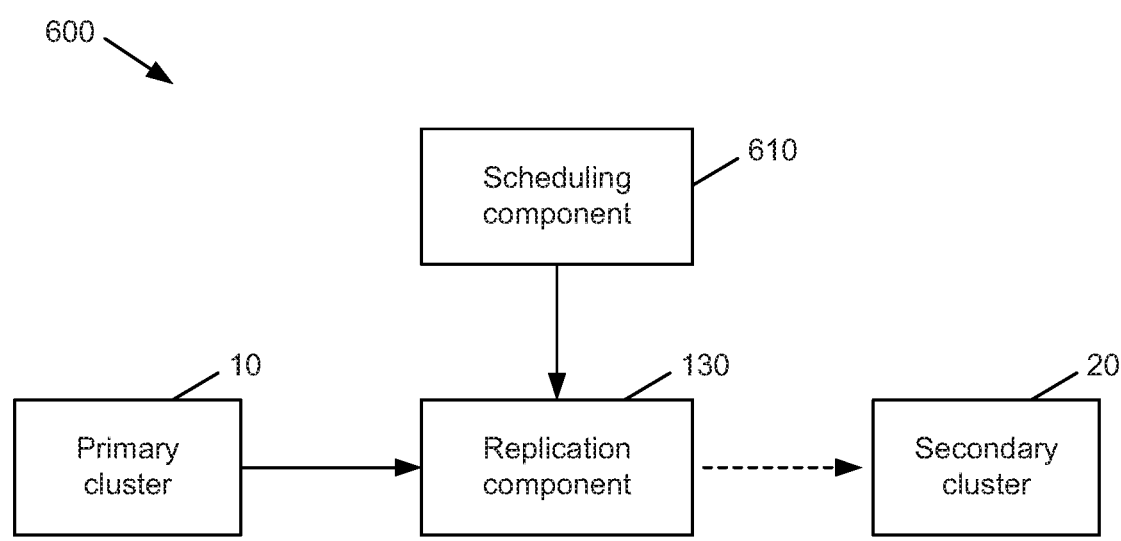
FIG. 6 is a block diagram of a system that facilitates replicating information from a primary cluster to a secondary cluster according to a schedule in accordance with various aspects described herein.

Referring now to FIG. 6, a block diagram of a system 600 that facilitates replicating information from a primary cluster 10 to a secondary cluster 20 according to a schedule in accordance with various aspects described herein is illustrated. Repetitive description of like elements employed in other embodiments described herein is omitted for brevity. As shown by FIG. 6, system 600 includes a replication component 130 that can replicate configuration information and/or other data from a primary cluster (site) 10 to a secondary cluster (site) 20 as described above. System 600 as shown by FIG. 6 further includes a scheduling component 610 that can schedule replication via the replication component 130 at intervals of a period defined by an RPO for the data storage system.

In an aspect, an RPO associated with the scheduling component 610 can be a fixed interval and/or a dynamically configurable interval based on various properties of system 600. Also or alternatively, the scheduling component 610 can facilitate replication via the replication component 130 according to multiple RPOs that are assigned to respective types of data. For instance, because it is desirable to keep the primary cluster 10 and the secondary cluster 20 in a substantially similar operating state, the scheduling component 610 can in some cases define an RPO for configuration data that is shorter than that assigned to other data. By way of non-limiting example, an RPO for configurations can be set between approximately five minutes to approximately one hour, while an RPO for other data can be set to a longer time period.

Figure 7:
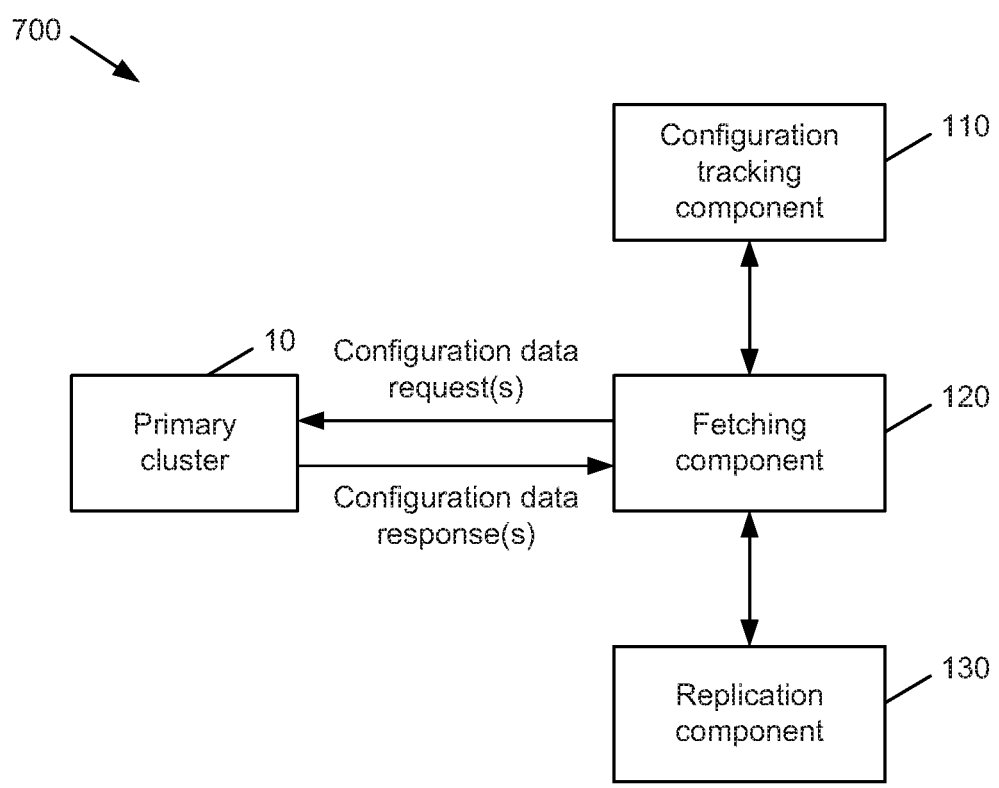
FIG. 7 is a block diagram of a system that facilitates fetching modified configuration data from a primary cluster in accordance with various aspects described herein.

Turning next to FIG. 7, a block diagram of a system 700 that facilitates fetching modified configuration data from a primary cluster 10 in accordance with various aspects described herein is illustrated. Repetitive description of like elements employed in other embodiments described herein is omitted for brevity. As shown by system 700, the fetching component 120 can obtain modified configurations as identified by the configuration tracking component 110 (e.g., via a configuration change log) by submitting requests to the primary cluster 10 for the respective changed configurations. In response to the requests, the primary cluster 10 can provide the relevant configuration data back to the fetching component 120, which can then provide said configurations to the replication component 130 for application to other clusters or sites.

With further reference to FIG. 7 and additional reference to FIG. 2, the platform interface component 210 can receive requests as hypertext transfer protocol (HTTP) requests, such as GET, POST, PUT, and/or DELETE requests, in some implementations. In this example, if the platform interface component 210 receives a DELETE, POST, or PUT request pertaining to a given configuration, the configuration tracking component 110 can determine from the nature of the request that the target configuration of the request is being modified. Subsequently, the request can be entered in the configuration change log (e.g., by the logging component 310 shown in FIG. 3) with reference to a uniform resource identifier (URI) corresponding to the configuration and the time of the request, e.g., in the manner shown by diagram 500.

As a result of the above, at the time of replication the fetching component 120 can obtain modified configurations from the primary cluster 10 by submitting HTTP GET requests to the primary cluster 10 for the URIs corresponding to the changed configurations. Because only the modified configurations are requested in this manner, the total number of API calls associated with obtaining configuration data from the primary cluster 10 can be substantially reduced in comparison to a system in which each configuration is fetched for every replication in order to check the configurations for changes. For instance, performing fetching in this manner can reduce the number of API calls utilized for fetching by up to 100%, e.g., in the case in which no configurations have changed since the previous replication.

Figure 8:
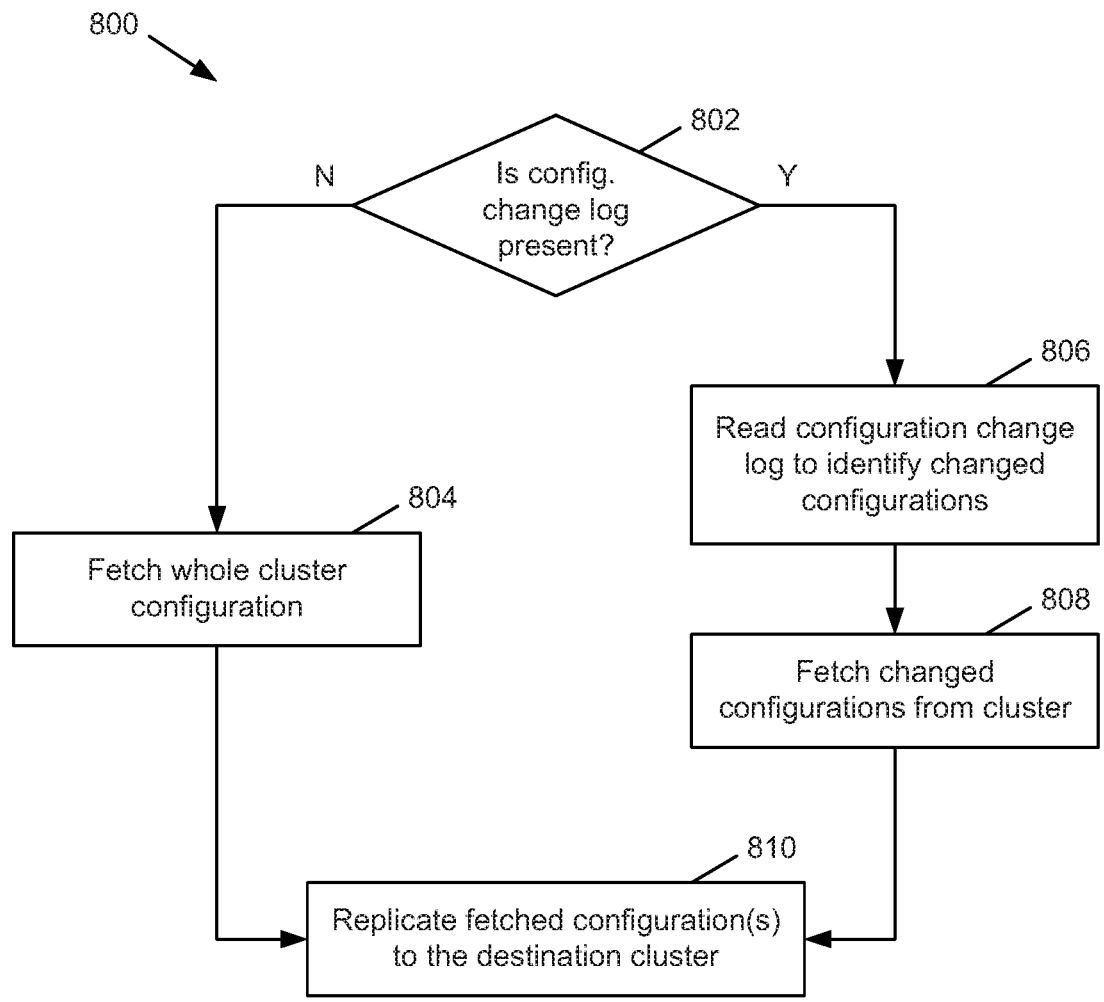
FIG. 8 is a flow diagram of a method for fetching and replicating configuration information in accordance with various aspects described herein.

With reference now to FIG. 8, a flow diagram of a method 800 for fetching and replicating configuration information in accordance with various aspects described herein is provided. At 802, a configuration tracking component 110, a fetching component 120, and/or other suitable components of a data storage system can determine whether a configuration change log is present for the system.

If a configuration change log is determined not to be present at 802, method 800 can proceed to 804 to fetch (e.g., via the fetching component 120) the whole cluster configuration. In contrast, if a configuration change log is determined to be present at 802, method 800 can instead proceed to 806, in which the configuration change log is read to identify the changed configurations, and to 808, where only those changed configurations are fetched from the cluster, e.g., in the manner shown by system 700.

As further shown in FIG. 8, following fetching of either the whole cluster configuration at 804 or fetching changed configurations from the cluster at 808, method 800 can conclude at 810 by replicating the fetched configuration(s) (e.g., via a replication component 130) to a destination cluster.

Figure 9:
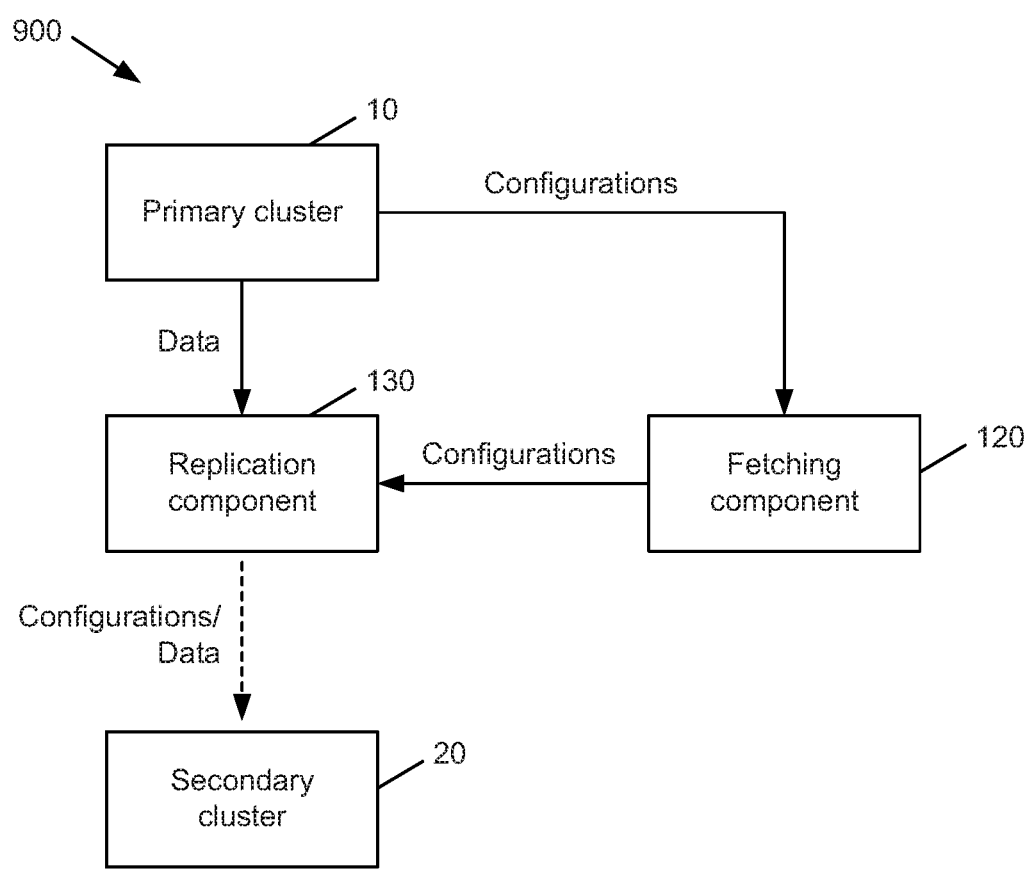
FIG. 9 is a block diagram of a system that facilitates replicating configuration information and data from a primary cluster to a secondary cluster in accordance with various aspects described herein.

Turning now to FIG. 9, a block diagram of a system 900 that facilitates replicating configuration information and data from a primary cluster 10 to a secondary cluster 20 in accordance with various aspects described herein is illustrated. Repetitive description of like elements employed in other embodiments described herein is omitted for brevity. As shown by system 900, stored data can be replicated from a primary cluster 10 to a secondary cluster 20 in addition to, or in place of, configuration data as described above.

In an aspect, data and configurations can be configured with different RPOs such that they are replicated at different intervals. For instance, configurations can be given a shorter RPO than data such that the configurations are replicated more frequently than the stored data. Alternatively, both data and configurations can be copied at each replication. In one example, deduplication, compression, and/or other strategies can be utilized to reduce the volume of data that is transferred between the primary cluster 10 and the secondary cluster 20 at the time of replication.

In the example shown by system 900, the fetching component 120 can obtain configuration information from the primary cluster 10 according to various aspects as described above, which can then be relayed to the replication component 130. Additionally, the primary cluster 10 can provide data to be replicated to the replication component 130, either directly as shown in system 900 or indirectly, e.g., via the fetching component 120 in a similar manner to that described above with respect to configurations.

In an aspect, the replication component 130 can be configured to adapt specific configuration information received from the primary cluster 10 via the fetching component 120 to the secondary cluster 20 rather than performing a direct copy of the configuration data. For instance, because the primary cluster 10 and the secondary cluster 20 may differ in terms of IP addresses, system specifications, host identifiers, and/or other properties, the replication component 130 can be configured to adapt specific configuration data received from the primary cluster 10 such that it can function similarly at the secondary cluster 20 according to the specifications of the secondary cluster 20. In addition to this adaptation, the replication component 130 can be configured to replicate stored data from the primary cluster 10 to the secondary cluster 20 either on a direct one-to-one basis and/or with similar modifications to account for differences in cluster specifications.

In another aspect, configuration replication as described above can be enabled when a cluster is created and before it is configured, e.g., per customer specifications. In this example, the configuration changes associated with setting up the cluster can be made available in the configuration change log such that the replication component 130 can go through the log and fetch the modified configurations as indicated.

Also or alternatively, configuration replication as described above can be enabled in response to the start of a replication from a primary cluster 10 to a secondary cluster 20. As a result of this approach, the configuration change log can be used to fetch specific cluster configurations that have changed since a previous stable state between the primary cluster 10 and the secondary cluster 20.

Figure 10:
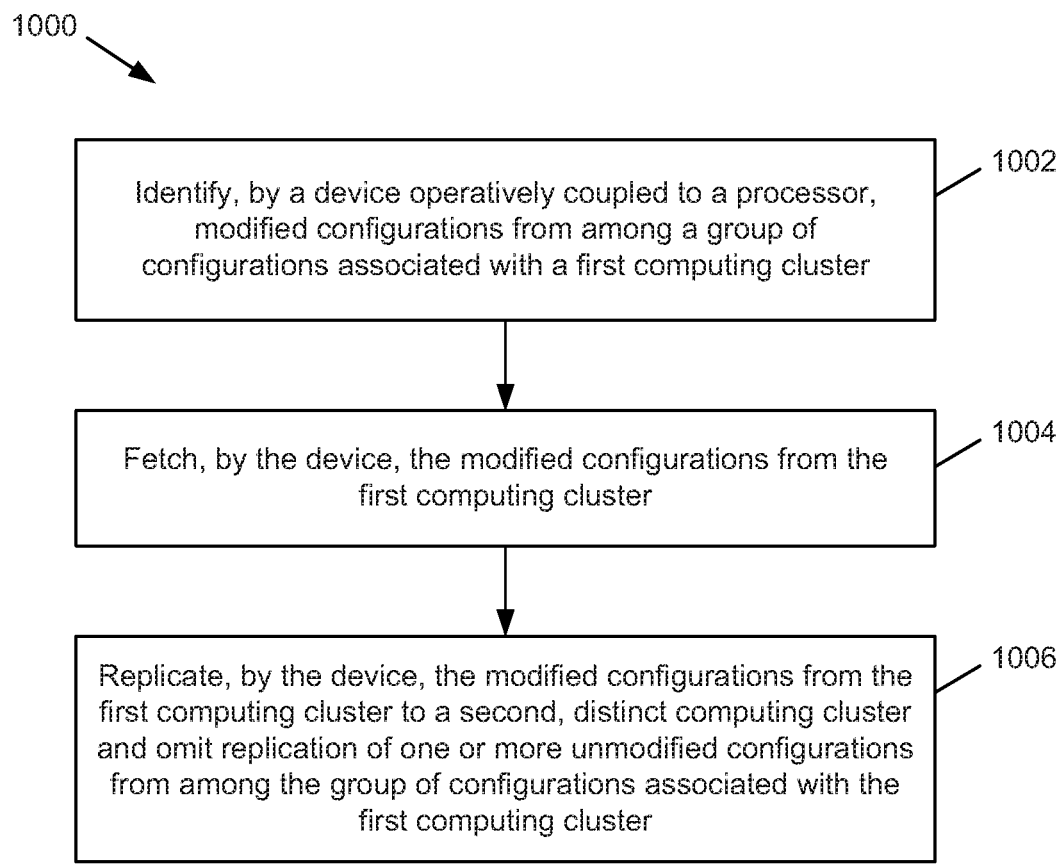
FIG. 10 is a flow diagram of a method that facilitates efficient configuration replication using a configuration change log in accordance with various aspects described herein.

Referring next to FIG. 10, a flow diagram of a method 1000 that facilitates efficient configuration replication using a configuration change log in accordance with various aspects described herein is illustrated. At 1002, a device operatively coupled to a processor can identify (e.g., by a configuration tracking component 110) modified configurations from among a group of configurations that are associated with a first computing cluster (e.g., a primary cluster 10).

At 1004, the device can fetch (e.g., by a fetching component 120) the modified configurations identified at 1002 from the first computing cluster.

At 1006, the device can replicate (e.g., by a replication component 130) the modified configurations fetched at 1004 from the first computing cluster to a second computing cluster (e.g., a secondary cluster 20) that is distinct from the first computing cluster while omitting replication of one or more unmodified configurations from among the group of configurations associated with the first computing cluster. In other words, the device can replicate only the identified modified configurations at 1006 without replicating the entire cluster configuration.

FIGS. 4, 8, and 10 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
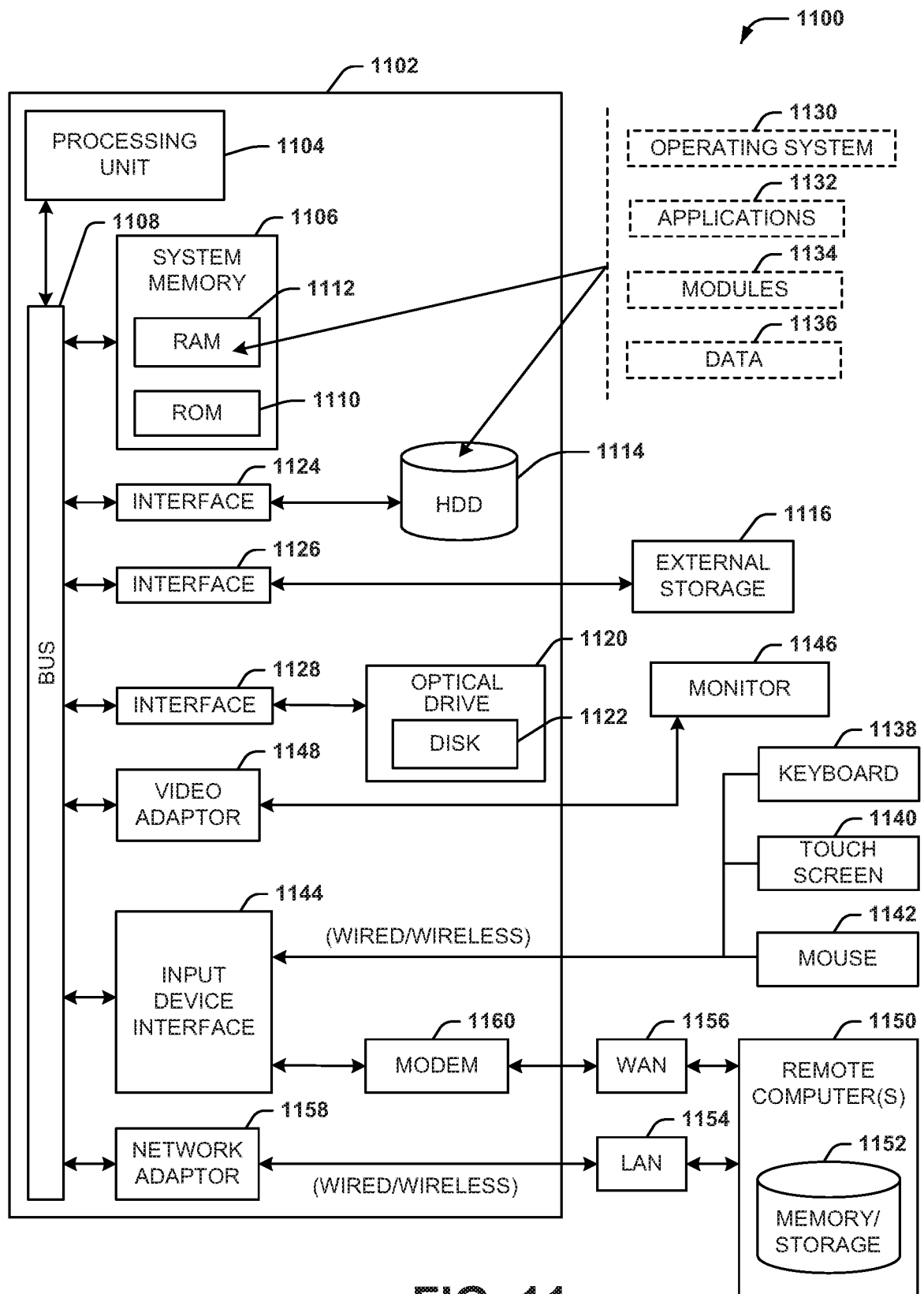
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
   a platform interface component that receives, via a first application programming interface (API), first requests relating to target configurations of a group of configurations associated with a first computing cluster of the data storage system, the first requests comprising respective uniform resource identifiers (URIs) respectively corresponding to the target configurations;

a configuration tracking component that identifies, based on contents of the first requests received via the first API, modified configurations of the target configurations;
a fetching component that obtains the modified configurations as identified by the configuration tracking component by submitting second requests to the first computing cluster, the second requests being directed to respective second APIs at the first computing cluster and associated with selected URIs, of the URIs, that respectively correspond to the modified configurations, and receiving the modified configurations from the first computing cluster via the second APIs in response to the second requests; and
a replication component that replicates the modified configurations as obtained by the fetching component from the first computing cluster to a second computing cluster of the data storage system that is distinct from the first computing cluster, wherein the replication component omits replication of one or more unmodified configurations of the group of configurations.

2. The data storage system of claim 1, wherein the computer executable components further comprise:
a logging component that records information relating to a selected request, of the first requests received via the first API, to a configuration change log in response to determining that the selected request of the first requests alters an operating state of the first computing cluster.

3. The data storage system of claim 2, wherein the configuration tracking component identifies the modified configurations via the configuration change log.

4. The data storage system of claim 2, wherein the configuration change log comprises a database, and wherein the database comprises respective records that include identifiers for respective configurations of the group of configurations and timestamps indicating times at which the respective configurations were modified.

5. The data storage system of claim 4, wherein the logging component records the information relating to the selected request of the first requests by updating a timestamp of a record of the configuration change log corresponding to a target configuration, of the target configurations, associated with the selected request to a time at which the request was received.

6. The data storage system of claim 4, wherein the logging component adds a record to the configuration change log corresponding to a target configuration, of the target configurations, associated with the selected request in response to determining that none of the respective records of the database correspond to the target configuration.

7. The data storage system of claim 2, wherein the first requests are hypertext transfer protocol (HTTP) requests, and wherein the logging component determines that the selected request alters the operating state of the first computing cluster in response to the selected request being of a type selected from a group of types comprising a post request, a put request, and a delete request.

8. The data storage system of claim 1, wherein the computer executable components further comprise:
a scheduling component that schedules operation of the replication component at intervals of a period defined by a recovery point objective for the data storage system.

9. The data storage system of claim 1, wherein the replication component replicates data stored on the first computing cluster to the second computing cluster in addition to replicating the modified configurations from the first computing cluster to the second computing cluster.

10. The data storage system of claim 1, wherein the modified configurations indicate first properties of the first computing cluster, and wherein the replication component alters the modified configurations, prior to replicating the modified configurations to the second computing cluster, to indicate second properties of the second computing cluster instead of the first properties of the first computing cluster.

11. A method, comprising:
receiving, via a first application programming interface (API) at a device operatively coupled to a processor, first requests relating to target configurations from among a group of configurations associated with a first computing cluster, the first requests indicating respective uniform resource identifiers (URIs) respectively corresponding to the target configurations;
identifying, by the device and based on contents of the first requests received via the first API, modified configurations of the target configurations;
fetching, by the device, the modified configurations from the first computing cluster by submitting second requests to respective second APIs at the first computing cluster, the second requests being associated with selected URIs, of the URIs, that respectively correspond to the modified configurations, and receiving the modified configurations from the first computing cluster via the second APIs in response to the second requests; and
replicating, by the device, the modified configurations from the first computing cluster to a second computing cluster that is distinct from the first computing cluster and omitting replication of one or more unmodified configurations from among the group of configurations associated with the first computing cluster.

12. The method of claim 11, further comprising:
recording, by the device, information associated with a selected request, of the first requests, to a configuration change log in response to determining that the selected request would alter an operating state of the first computing cluster.

13. The method of claim 12, wherein the configuration change log comprises a database, and wherein the database comprises respective records that include identifiers for respective configurations of the group of configurations and timestamps indicating times at which the respective configurations were modified.

14. The method of claim 13, wherein the recording comprises:
identifying a first time at which the request was received; and
updating a timestamp in a record of the configuration change log corresponding to the first configuration to the first time.

15. The method of claim 13, wherein the recording comprises:
appending a record to the configuration change log corresponding to the first configuration in response to determining that none of the respective records of the database correspond to the first configuration.

16. A non-transitory machine-readable medium comprising computer executable instructions that, when executed by a processor of a data storage system, facilitate performance of operations, the operations comprising:
receiving, via a first application programming interface (API), first requests associated with target configurations from among a group of configurations associated with a first computing subsystem of the data storage system, the first requests indicating uniform resource identifiers (URIs) respectively corresponding to the target configurations;

tracking, based on contents of the first requests received via the first API, modified configurations from among the target configurations;

acquiring the modified configurations from the first computing subsystem by submitting second requests to respective second APIs at the first computing subsystem, the second requests being associated with selected URIs, of the URIs, that respectively correspond to the modified configurations, and receiving the modified configurations from the first computing subsystem via the second APIs in response to the second requests; and replicating the modified configurations from the first computing subsystem to a second computing subsystem that is distinct from the first computing subsystem while omitting replication of one or more unmodified configurations from among the group of configurations.

17. The non-transitory machine-readable storage medium of claim 16, wherein the operations further comprise:

recording information associated with a selected request, of the first requests, to a configuration history log in response to determining that the selected request alters an operating state of the first computing subsystem.

18. The non-transitory machine-readable medium of claim 17, wherein the configuration history log comprises a database, and wherein the database comprises respective records that include identifiers for respective configurations of the group of configurations and timestamps indicating times at which the respective configurations were last altered.

19. The non-transitory machine-readable medium of claim 18, wherein the operations further comprise:

identifying a first time at which the request was received; and updating a timestamp in a first record of the configuration history log corresponding to the first configuration to the first time in response to determining that the first record exists in the configuration history log.

20. The non-transitory machine-readable medium of claim 18, wherein the operations further comprise:

creating a record in the configuration history log corresponding to the first configuration in response to determining that none of the respective records of the database correspond to the first configuration.

* * * * *